US012613371B1

(12) United States Patent
Wang

(10) Patent No.: US 12,613,371 B1
(45) Date of Patent: Apr. 28, 2026

(54) LAMP OF TRAFFIC LIGHT

(71) Applicant: JUNEY INDUSTRIAL CO., LTD.,
Taichung City (TW)

(72) Inventor: Chia-Chin Wang, Taichung City (TW)

(73) Assignee: JUNEY INDUSTRIAL CO., LTD.,
Taichung City (TW)

( * ) Notice: Subject to any disclaimer, the term of this
patent is extended or adjusted under 35
U.S.C. 154(b) by 0 days.

(21) Appl. No.: 19/241,412

(22) Filed: Jun. 18, 2025

(51) Int. Cl.
*G02B 6/00* (2006.01)
*F21V 8/00* (2006.01)

(52) U.S. Cl.
CPC ......... *G02B 6/0068* (2013.01); *G02B 6/0055*
(2013.01)

(58) Field of Classification Search
CPC ............................ G02B 6/0055; G02B 6/0068
See application file for complete search history.

(56) References Cited

U.S. PATENT DOCUMENTS

| 2012/0243260 A1* | 9/2012 | Ohno | ................... G02B 6/0078 |
| | | | 362/613 |
| 2016/0282539 A1* | 9/2016 | Li | ...................... F21V 33/0012 |

FOREIGN PATENT DOCUMENTS

| JP | 2015228320 A | * | 12/2015 |
| JP | 2021022466 A | * | 2/2021 |

* cited by examiner

*Primary Examiner* — Gerald J Sufleta, II
(74) *Attorney, Agent, or Firm* — Leong C. Lei

(57) ABSTRACT

A lamp of a traffic light includes a light-transmitting pro-
tective cover including a convex portion and a circumfer-
ential flange, a light guide plate having a light emitting
surface on which light blocking points are arranged and an
opposite bottom surface, a light-emitting strip including
LED lights surrounding an outer circumferential surface of
the light guide plate, a light reflection plate having a light
reflection surface, and a circumferential frame in the form of
a ring having an inner circumferential groove communicat-
ing with interior surrounded by the circumferential frame. A
wall of the inner circumferential groove forms a light
reflection surface. The protective cover, the light guide plate,
and the light reflection plate are stacked together and are
received, together with the light-emitting strip, in the inner
circumferential groove of the circumferential frame so as to
be looped by the circumferential frame and combined
together.

10 Claims, 12 Drawing Sheets

LAMP OF TRAFFIC LIGHT

BACKGROUND OF THE INVENTION

(a) Technical Field of the Invention

The present invention relates to a lamp of a traffic light, and more particularly to a lamp formed of a light guide plate and light-emitting diode (LED) lights surrounding an outer circumferential surface of the light guide plate, in combination with a light reflection plate and a circumferential frame for being applicable to a traffic light.

(b) Description of the Prior Art

Traffic lights (also known as stoplights) are important facilities used to guide pedestrians and vehicles to move forward or not. Each intersection must be equipped with 4 traffic light holders, of which the number is quite large, and thus, also consume a lot of electricity. In order to achieve the goal of energy saving, the light source of current traffic lights has been changed to light-emitting diode (LED) lights that are more energy-saving. According to observation, each lamp (including red, green, and yellow lights) of the known traffic lights is powered by more than 100 LED lights. If arrow signal lights for indicating turning directions are included, each traffic sign will use about 500 to 600 LED lights. Therefore, all the traffic lights that continuously provide driving guidance 24 hours a day around the world still consume a considerable amount of electricity.

Taiwan Invention U.S. Pat. No. 1,589,811 discloses a traffic light patent (which will be hereinafter referred to as the prior art). The prior art achieves an effect of energy saving and power saving through reducing the number of LED lights used thereby by using a light guide plate in combination with LED lights, a reflector, and a diffuser, in order to be applicable to traffic lights or vehicle taillights. In terms of its technical features, the prior art is to set an LED light source on one of the sides of a rectangular light guide plate, and to arrange light reflection points on a light emitting surface of the light guide plate, so that the light reflection points arranged in a sparse-dense manner and the diffuser may make light emitted uniform. Although the prior art seems to be able to significantly reduce the number of LED lights used, it has the following disadvantages. The size of each circular lamp of the traffic light is 30 centimeters, that is each side length of the rectangular light guide plate of the prior art is 30 centimeters, so that for all the LED lights arranged on one of the sides of the light guide plate, it is not possible to set a larger number of LED lights, and when light transmits to the other side of the light source, there will be a situation of brightness declining. The prior art arranges LED lights for emitting yellow light, red light, and green light on one of the sides of the light guide plate in an alternate manner, so that the number of LED lights that emit the same color is further reduced. That is, when green light is emitted, the LED lights that emit yellow light and red light does not light up. Such an arrangement prevents the green light from being emitted with higher brightness (so are yellow light and red light), which will affect the judgment of passers-by and may cause danger. It is even worse that when the LED lights of one of the colors are partially damaged, the brightness emitted from the LEDs of that color will be further reduced, seriously affecting traffic safety.

SUMMARY OF THE INVENTION

The primary objective of the present invention is to provide a lamp of a traffic light, wherein the lamp comprises a protective cover, a light guide plate having light blocking points, and a plurality of LED lights surrounding an outer circumferential surface of the light guide plate, in combination with a light reflection plate and a light reflection surface of a circumferential frame, so that the light emitting from each of the LED lights is confined in the light guide plate surrounded by the circumferential frame, and the light is made uniformly emitting from a light emitting surface of the light guide plate, so as to exhibit an effect of saving energy and also to make each lamp emitting a higher brightness and uniform visual effect, when used in a traffic light.

In view of the above, the present invention provides a lamp of a traffic light, which comprises: a light guide plate, a protective cover, a light reflection plate, a light-emitting strip, and a circumferential frame;

the light guide plate having one side defining a light emitting surface and an opposite side defining a bottom surface, an outer circumferential surface arranged between and circumferentially surrounding the light emitting surface and the bottom surface, the light emitting surface comprising light blocking points formed thereon and arranged at intervals;

the protective cover being made of a light-transmissive material and comprising a convex portion and a circumferential flange, the circumferential flange circumferentially surrounding an outer edge of the convex portion;

the light-emitting strip comprising a circuit substrate and a plurality of light-emitting diode (LED) lights arranged on the circuit substrate, each of the LED lights being electrically connected to the circuit substrate, the circuit substrate being of flexibility and bendable;

the light reflection plate being positioned against and in contact with the bottom surface of the light guide plate and having a surface facing the light guide plate the bottom surface and forming a light reflection surface with a light reflecting effect;

the circumferential frame being in the shape of a ring and comprising an inner circumferential groove, the inner circumferential groove being in communication with an interior surrounded by the circumferential frame, a wall surface of the inner circumferential groove forming a light reflection surface with a light reflecting effect, so as to form a closed chamber for reflecting light; and the protective cover being positioned against and in contact with the light emitting surface of the light guide plate, the light reflection surface of the light reflection plate being positioned against and in contact with the bottom surface of the light guide plate, the light-emitting strip circumferentially wrapping around the outer circumferential surface of the light guide plate, each of the LED lights being positioned on and in contact with the outer circumferential surface of the light guide plate, each of the LED lights being arranged to face each other, the protective cover, the light guide plate, the light reflection plate, and the light-emitting strip being received in the inner circumferential groove of the circumferential frame and surrounded by the circumferential frame to be combined together.

Preferably, the light blocking points on the light emitting surface of the light guide plate are arranged to extend, in a spare-to-dense manner, from a light emitting surface periphery toward a light emitting surface center to form a light blocking line, and the light emitting surface is provided with multiple light blocking lines arranged at intervals.

Preferably, light blocking points are formed on the bottom surface of the light guide plate and arranged at intervals, and the light blocking points are arranged to extend, in a spare-to-dense manner, from a bottom surface periphery toward a bottom surface center to form a light blocking line, and the bottom surface is provided with multiple light blocking lines arranged at intervals.

Through the above design, the light emitting from each of the LED lights is confined in the light guide plate, together with the effect of diffusion and refraction induced by each of the light blocking points and the effect of reflection achieved with the light reflection surface of the light reflection plate and the light reflection surface of the circumferential frame, light can be uniformly emitted from the light emitting surface of the light guide plate, and, when used in a traffic light, achieves not only an effect of saving energy, but also makes the lamp emit a higher brightness and uniform visual effect.

DETAILED DESCRIPTION OF THE PREFERRED EMBODIMENTS

Figure 1:
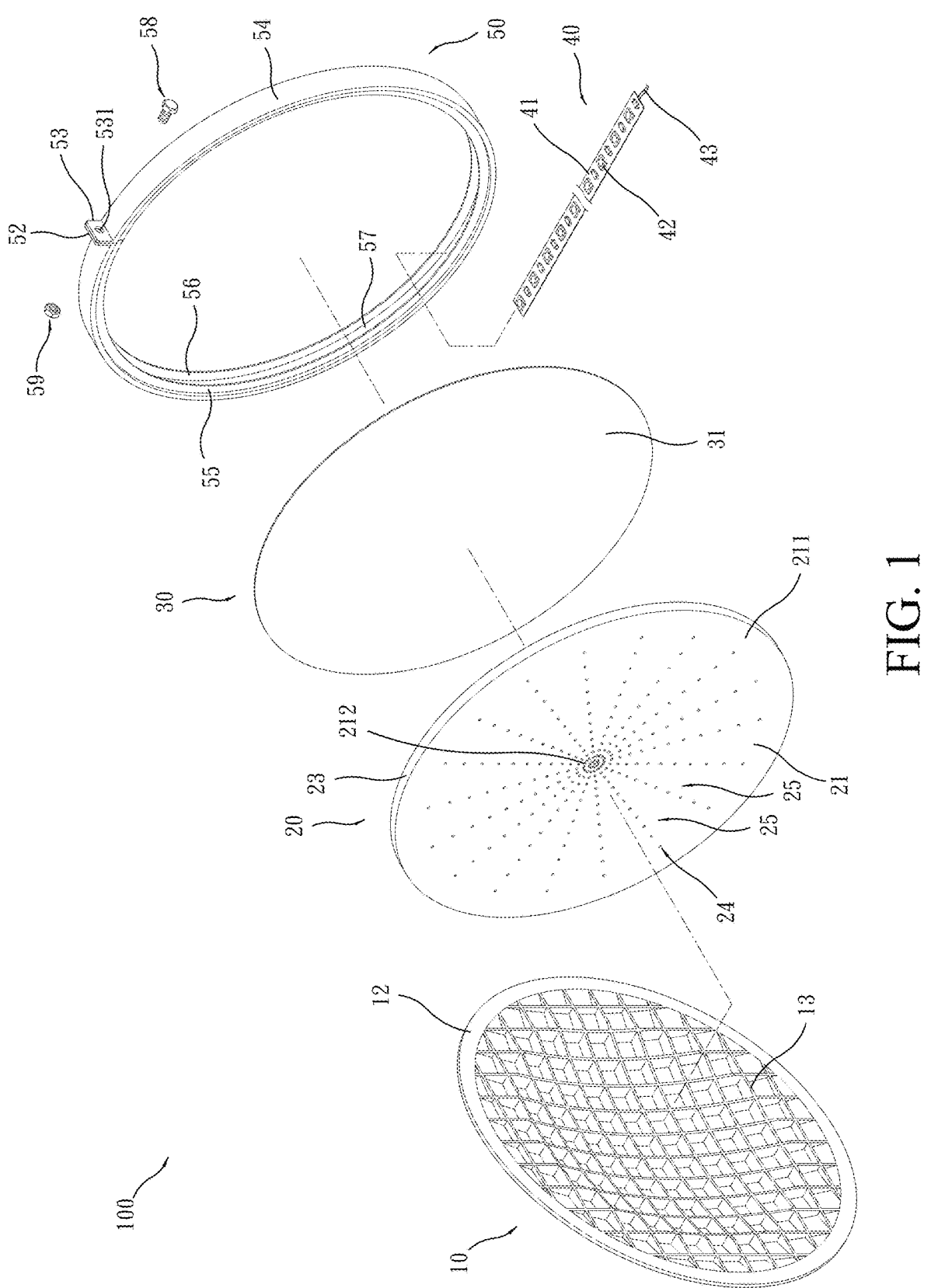
FIG. 1 is an exploded view of a preferred embodiment of the present invention.
Figure 2:
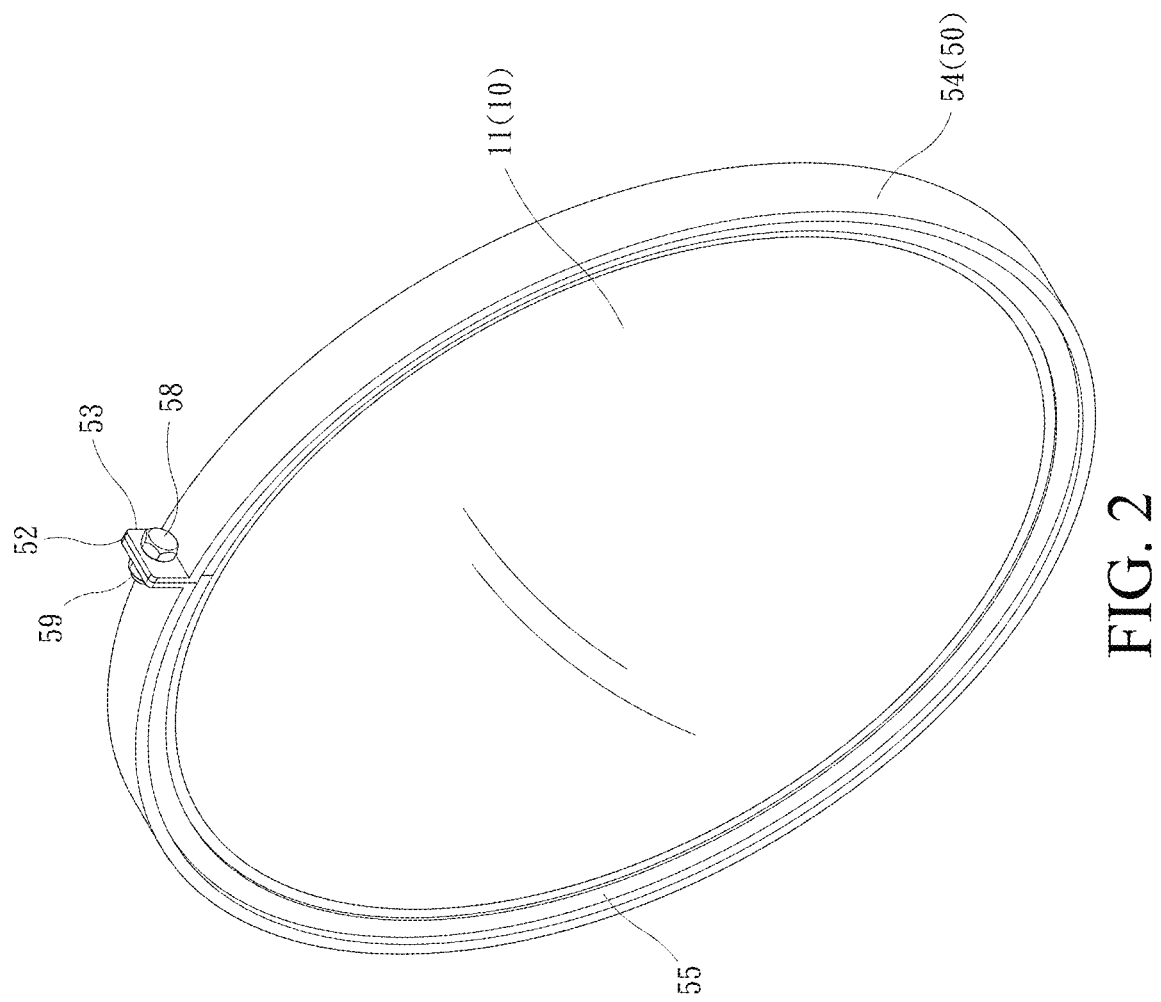
FIG. 2 is a perspective view of the preferred embodiment of the present invention in an assembled form.
Figure 3:
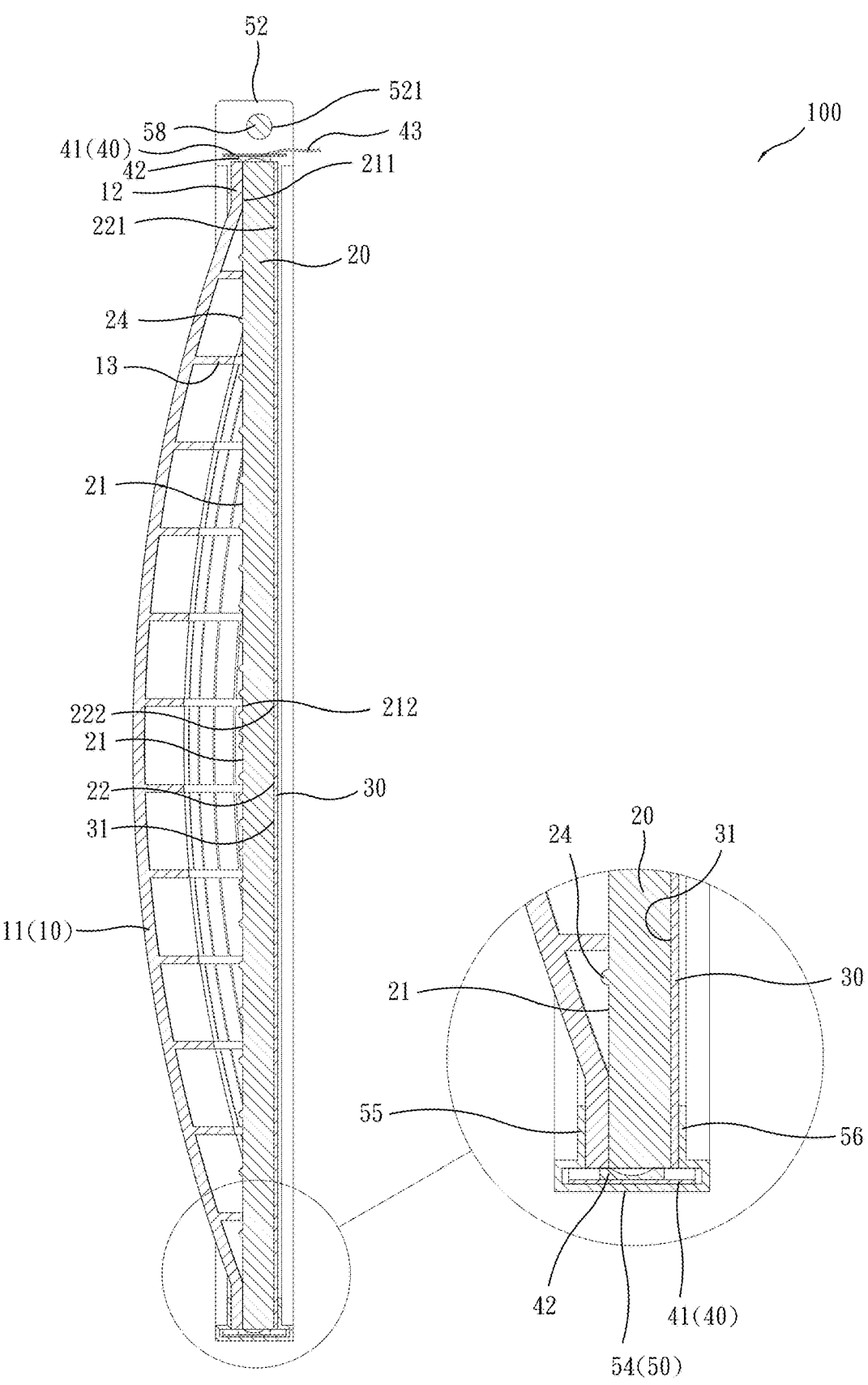
FIG. 3 is a cross-sectional view of the preferred embodiment of the present invention.

Referring to FIGS. 1-3, a lamp 100 of a traffic light according to the instant embodiment comprises a light guide plate 20, a protective cover 10, a light reflection plate 30, a light-emitting strip 40, and a circumferential frame 50.

Figure 6:
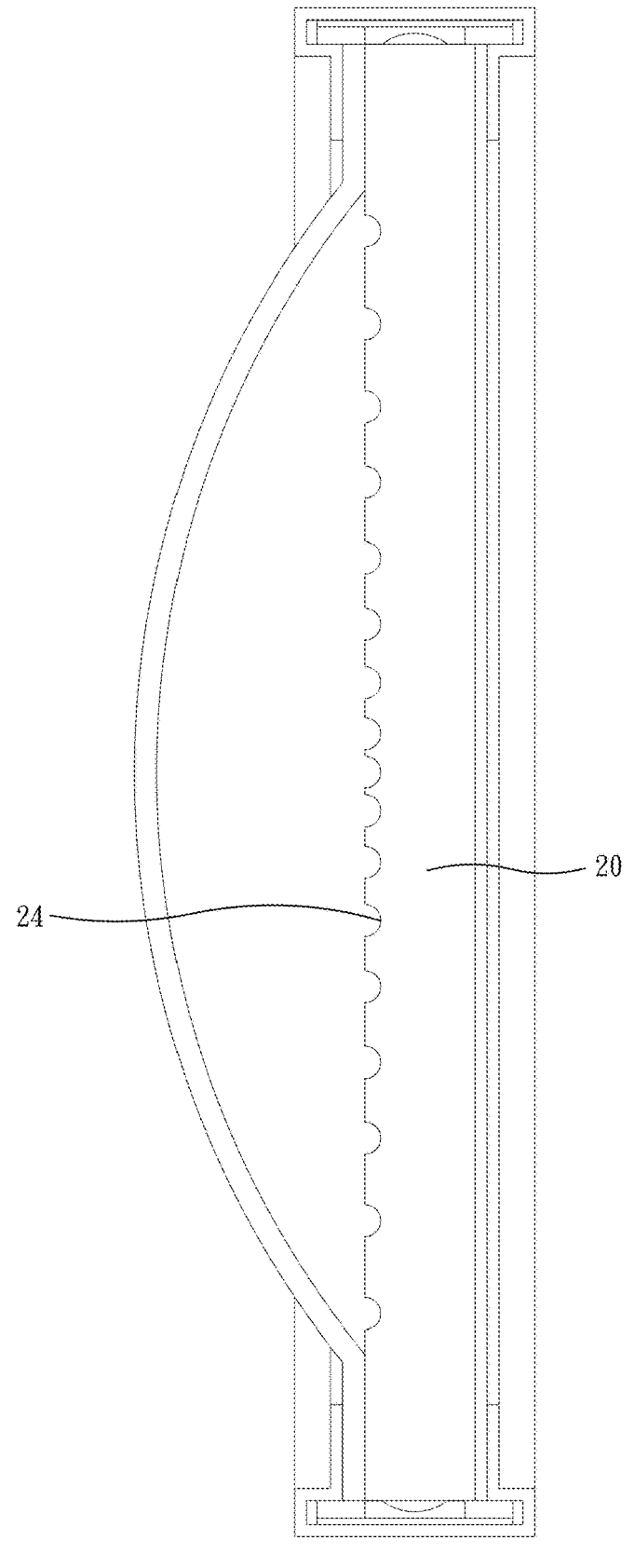
FIG. 6 shows a second example of implementation of light blocking points on a light guide plate according to the present invention.
Figure 7:
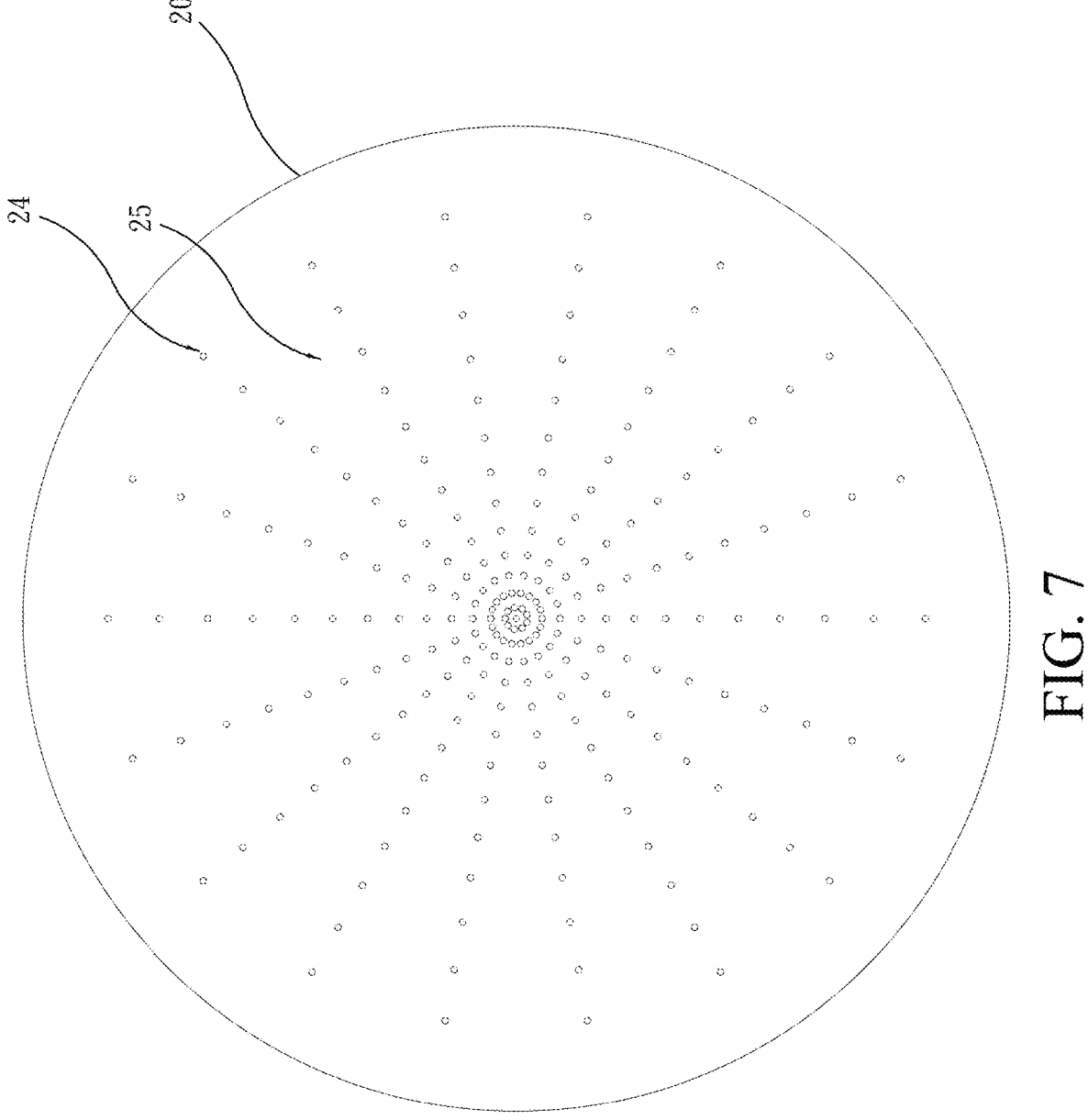
FIG. 7 shows a third example of implementation of light blocking points on a light guide plate according to the present invention.

The light guide plate 20 is a flat plate of a circular shape made of a material of high light transmittance including poly(methyl methacrylate) (PMMA) resin and polycarbonate (PC), and has one side defining a light emitting surface 21 and an opposite side defining a bottom surface 22, and an outer circumferential surface 23 arranged between and circumferentially surrounding the light emitting surface 21 and the bottom surface 22, wherein the light emitting surface 21 comprises light blocking points 24 formed thereon and arranged at intervals, and individual ones of the light blocking points 24 are arranged to extend, in a spare-to-dense manner, from a light emitting surface periphery 211 toward a light emitting surface center 212 to form a light blocking line 25, wherein the light emitting surface 21 is provided with multiple light blocking line 25 arranged at intervals, and further, the light blocking points 24 can be set as convex points as shown in FIG. 1, or can alternatively be set as concave points as shown in FIG. 6, or can be alternatively formed by coating ink of low light absorption rate on the light emitting surface as shown in FIG. 7, wherein the ink is preferably transparent.

The protective cover 10 is made of a light-transmissive material and comprises a convex portion 11, which is of a circular shape, and a circumferential flange 12, wherein the circumferential flange 12 circumferentially surrounds an outer edge of the convex portion 11, and the convex portion 11 and the circumferential flange 12 are integrally formed as one piece, and a back side of the convex portion 11 is formed in a concave configuration, and the back side of the convex portion 11 is formed with a grid 13 in a vertical-and-horizontal intersecting configuration.

The light reflection plate 30 is in the form of a circulate plate, which is positioned on and contacts the bottom surface 22 of the light guide plate 20 and has a surface that faces the bottom surface 22 of the light guide plate 20 and is formed as a light reflection surface 31 having a light reflecting effect, and is made of a material that can be a stainless steel plate or plastics, wherein for the material being plastics, the surface that faces the bottom surface 22 of the light guide plate 20 is processed into the light reflection surface 31 to exhibit the light reflecting effect.

Figure 11:
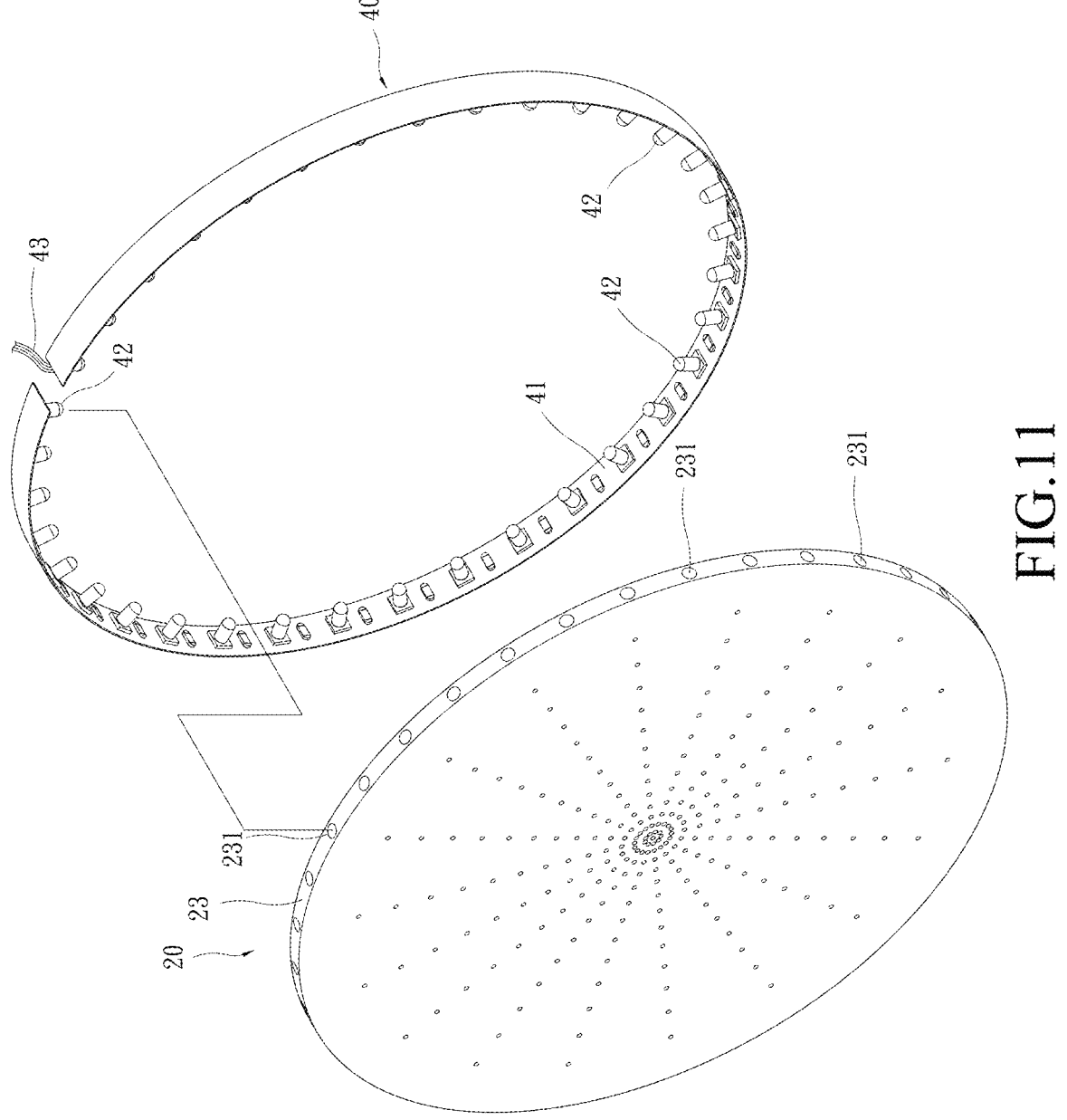
FIG. 11 shows a second example of implementation of a light guide plate and LED lights according to the present invention, showing each of the LED lights is embedded in an outer circumferential surface of the light guide plate.

The light-emitting strip 40 comprises a circuit substrate 41 and a plurality of light-emitting diode (LED) lights 42 arranged at intervals on the circuit substrate 41, wherein each of the LED lights 42 is electrically connected to the circuit substrate 41, and the circuit substrate 41 is of flexibility and is thus bendable, and the circuit substrate 41 is electrically connected through a power cable 43 to a traffic light control system (where the traffic light control system is a known technology and is not a novel part of the present invention and is thus no described herein), so that supplying electricity makes each of the LED lights 42 lit up, and the circuit substrate 41 is of flexibility and is thus bendable, and each of the LED lights 42 is operable to emit light of the same color, so that when the lamp 100 is formed to emit red light, LED lights that emit red light are used, and when the lamp 100 is formed to emit green light, LED lights that emit green light are used, and when the lamp 100 is formed to emit yellow light, LED lights that emit yellow light are used. Referring to FIG. 11, which shows a different way of implementation for the light guide plate 20 and the light-emitting strip 40, wherein the outer circumferential surface 23 of the light guide plate 20 is formed with a plurality of cavities 231 arranged at intervals, and each of the LED lights 42 arranged on the light-emitting strip 40 is made in the form of a protrusion, so that the LED lights 42 are respectively inserted into and fit in the cavities 231 corresponding thereto to have each of the LED lights 42 and the corresponding one of the cavities 231 are positioned against and in contact with each other, so that when the light-emitting strip 40 is wrapped around the outer circumferential surface 23 of the light guide plate 20, pseudo-bonding is achievable between the light-emitting strip 40 and the light guide plate 2, and the light-emitting strip 40 is not detached from the light guide plate 20 without applying a force to the light-emitting strip 40.

The circumferential frame 50 is in the shape of a loop or ring and comprises an outer circumferential surface 54 and side walls 55, 56 extending from two edges of the outer circumferential surface 54 toward interior surrounded by the circumferential frame 50, and an inner circumferential groove 57 is defined between the outer circumferential surface 54 and the two side walls 55, 56, and the inner circumferential groove 57 is in communication with the interior surrounded by the circumferential frame 50, and a wall surface of the inner circumferential groove 57 is formed as a light reflection surface 501 with a light reflecting effect, so as to form a closed chamber for reflecting light, and two ends of the circumferential frame 50 are connected together and each of the ends is formed with a radially outwardly protruding projection tab 52, 53 opposite to each other, and each of the projection tabs 52, 53 is formed with a through hole 521, 531 opposite to each other; and the circumferential frame 50 is made of a stainless steel material or a plastic material, wherein for the circumferential frame being made of a stainless steel material, the wall surface of the inner circumferential groove naturally exhibits the light reflection surface with the light reflecting effect, and for the circumferential frame being made of plastics, the wall surface of the inner circumferential groove is processed to exhibit the light reflection surface with the light reflecting effect.

Continuously referring to FIG. 3, the circumferential flange 12 of the protective cover 10 is positioned on and in contact with the light emitting surface 21 of the light guide plate 20, and the light reflection surface 31 of the light reflection plate 30 is positioned on and in contact with the bottom surface 22 of the light guide plate 20. The light-emitting strip 40 circumferentially wraps around the outer circumferential surface 23 of the light guide plate 20. Each of the LED lights 42 faces and is positioned against and in contact with the outer circumferential surface 23 of the light guide plate 20. The components, such as the protective cover 10, the light guide plate 20, the light reflection plate 30, and the light-emitting strip 40 are received in the inner circumferential groove 57 of the circumferential frame 50, and the two projection tabs 52, 53 are positioned against and in contact with each other, and a bolt 58 penetrates through the through hole 521, 531 of each of the projection tab 52, 53, while, on the opposite side, a nut 59 is screwed on the bolt 58 to securely combine the components, such as the protective cover 10, the light guide plate 20, the light reflection plate 30, and the light-emitting strip 40 with each other to form the traffic light lamp 100.

Figure 4:
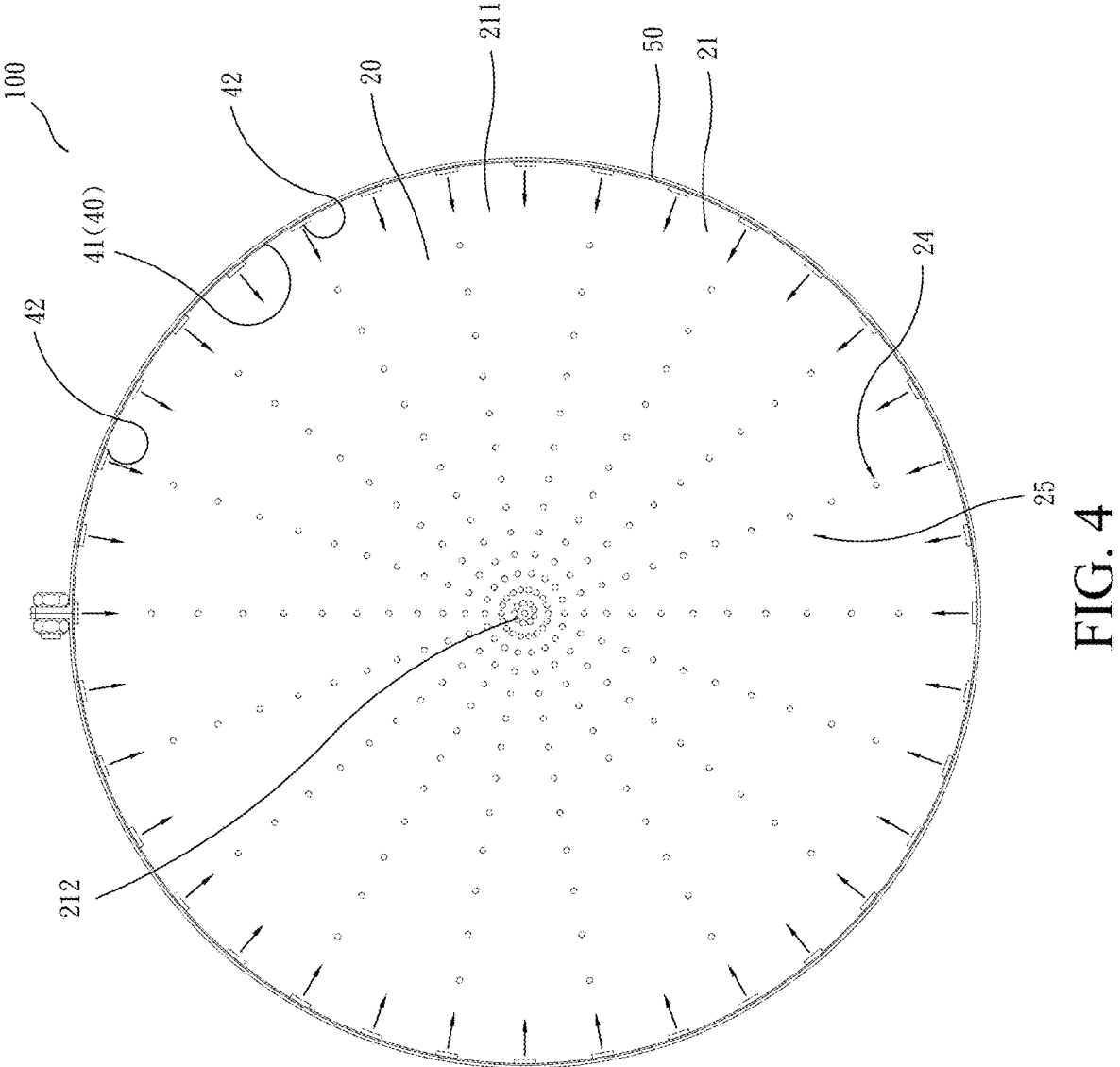
FIG. 4 is a schematic view showing a radial position relationship among components of the preferred embodiment of the present invention to show transmission of light from the periphery of the light guide plate toward the center of the light guide plate.
Figure 5:
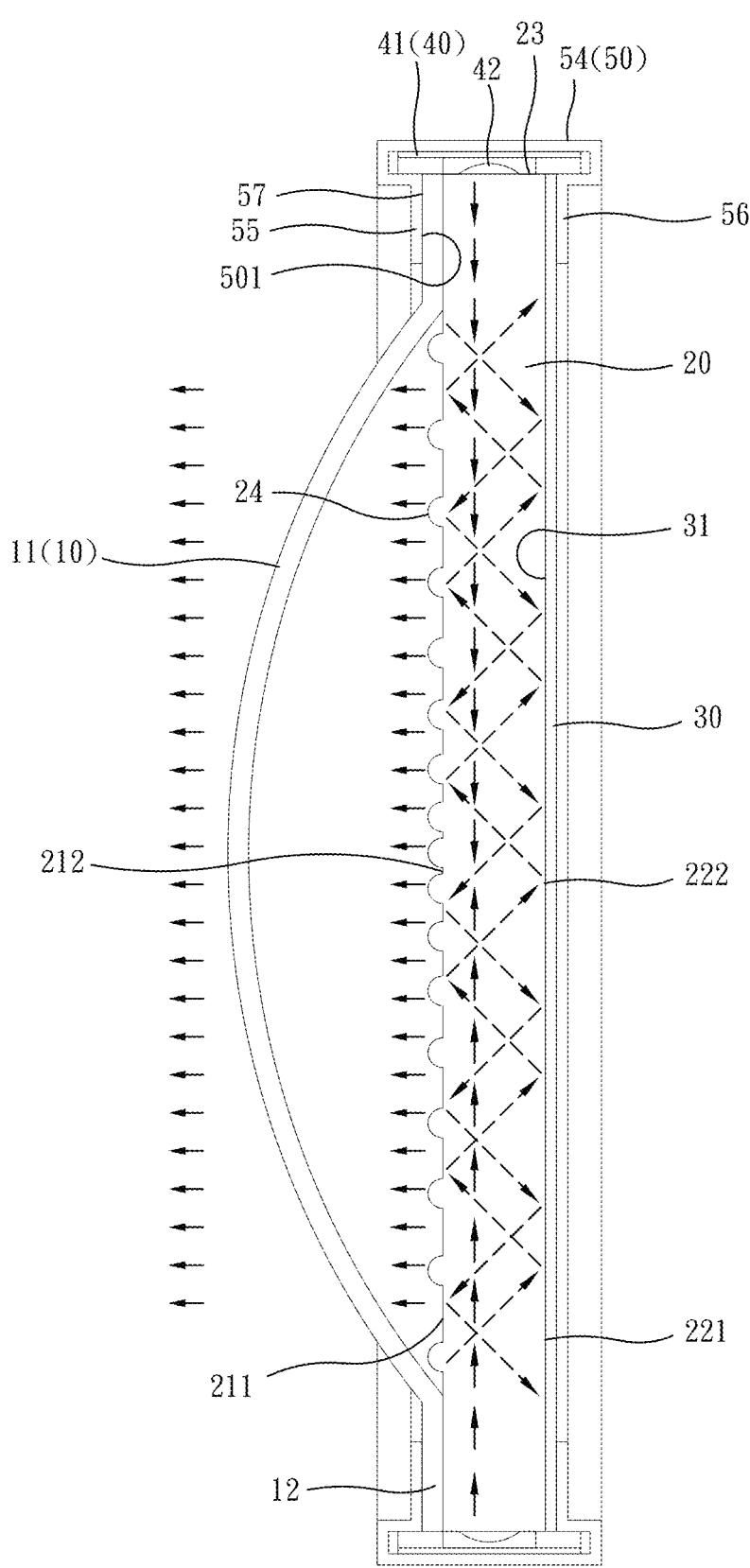
FIG. 5 is a schematic view showing an axial position relationship among components of the preferred embodiment of the present invention to show the direction of transmission of light caused by diffusion, refraction, and reflection.

Thus, the above provides an introduction to each of the components of a traffic light lamp 100 according to a preferred embodiment of the present invention and the way of assembly thereof, and in the following, characteristics of use will be described:

Referring to FIGS. 4 and 5, when electrical power is supplied to the circuit substrate 41, all the LED lights 42 that are circumferentially arranged to be positioned against and in contact with the outer circumferential surface 23 of the light guide plate 20 are lit up, and light emitting from each of the LED lights 42 is incident into the outer circumferential surface 23 and transmits from the light emitting surface periphery 211 toward the light emitting surface center 212, and when the light passes through the light blocking points 24 of the light emitting surface 21, each of the light blocking points 24 causes the light to diffuse (scatter) and refract. With the light blocking points 24 being arranged in a spare-to-dense manner from the light emitting surface periphery 211 of the light guide plate 20 toward the light emitting surface center 212, the light emitting from each of the LED lights 42 can surely reach the light emitting surface center 212, and the light will not be unable to reach the light emitting surface center 212 due to energy consumption by the light blocking points 24 on the light emitting surface periphery 211, thereby making the light emitting surface 21 achieve an effect of emission of uniform brightness.

Continuously referring to FIGS. 4 and 5, since in the present invention, the LED lights 42 are circumferentially arranged to be positioned against and in contact with the outer circumferential surface 23 of the light guide plate 20 to have the LED lights 42 face each other, and the wall surface of the inner circumferential groove 57 of the circumferential frame 50 is formed as the light reflection surface 501 with a light reflecting effect, the light emitting from each of the LED lights 42 is constantly reflected by the light reflection surface 501 of the inner circumferential groove 57 and all the light is confined in the interior surrounded by the circumferential frame 50 (that is, concentrated in the light guide plate 20) and is not lost, so that the brightness presented by the light emitting surface 21 of the light guide plate 20 is greatly enhanced.

Continuously referring to FIG. 5, when the light emitting from each of the LED lights 42 passes through each of the light blocking points 24, in addition to light diffusion, refraction also occurs, and the refracted light transmits in a direction toward the bottom surface 22 of the light guide plate 20 and, upon impinging the light reflection plate 30, is subjected to the reflecting effect of the light reflection surface 31 to transmit in the direction toward the light emitting surface 21 again and is acted upon by another one of the light blocking points 24 to cause diffusion and refraction again. Since the light emitting surface 21 is covered with the light blocking points 24, all the light blocking points 24 will continuously cause light to diffuse and refract in the same way, so as to therefore make the light emitting surface 21 exhibit a higher level of brightness.

Continuously referring to FIG. 4, since the LED lights 42 that are circumferentially arranged to surround the outer circumferential surface 23 of the light guide plate 20 are all of the same color and faces each other to point toward the light emitting surface center 212, for a known traffic light lamp of a diameter of 30 centimeters, the number of the LED lights 42 surrounding the light guide plate 20 is around 40 to 50, and compared with the known traffic light lamp that uses more than one hundred LED lights, the number of the LED lights 42 used in the present invention is only one-third of that, so as to achieve an effect of greatly saving energy. Further, in case that a few of the LED lights 42 are damaged, the brightness will not be greatly reduced, and the effect of instructing pedestrians and vehicles to move or stop is still achieved.

From the above description, it can be seen that the lamp 100 according to the present invention, when applied to a traffic light, not only has the effect of saving energy, but also makes each lamp emit a higher brightness and uniform visual effect.

Figure 8:
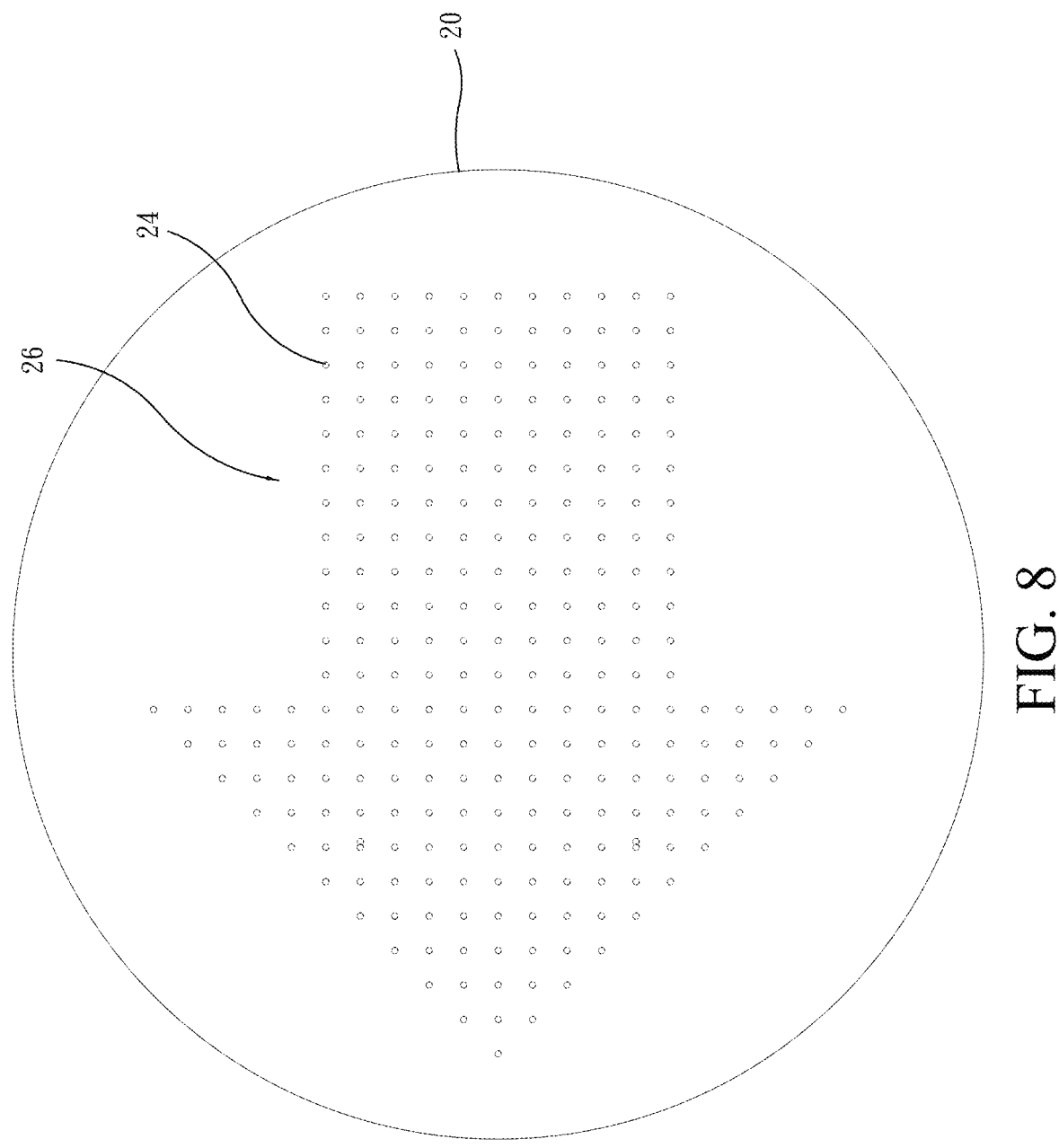
FIG. 8 shows a fourth example of implementation of light blocking points on a light guide plate according to the present invention.
Figure 9:
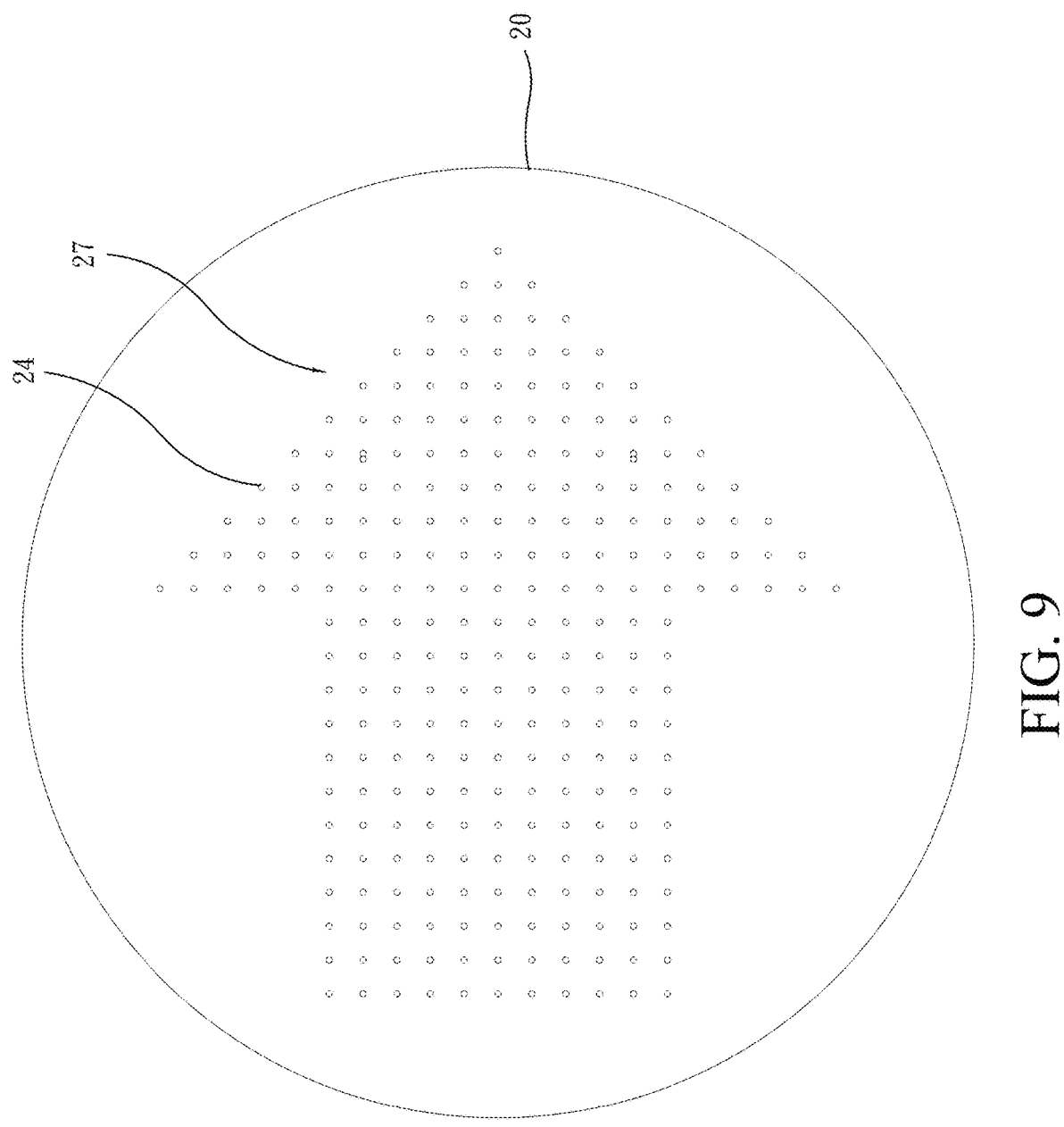
FIG. 9 shows a fifth example of implementation of light blocking points on a light guide plate according to the present invention.

Referring to FIGS. 8 and 9, in the instant embodiment, the lamp is applied to an arrow signal lamp for indicating left turn or right turn, wherein the light blocking points 24 on the light emitting surface 21 of the light guide plate 20 are arranged to form a left-turn arrow shape 26 (as shown in FIG. 8) or a right-turn arrow shape 27 (as shown in FIG. 9). When the LED lights are lit up, all the light blocking points 24 that form the left-turn arrow or the right-turn arrow, will be significantly bright so as to exhibit the left-turn arrow 26 or the right-turn arrow 27 to guide the road users to turn left or right.

Figure 10:
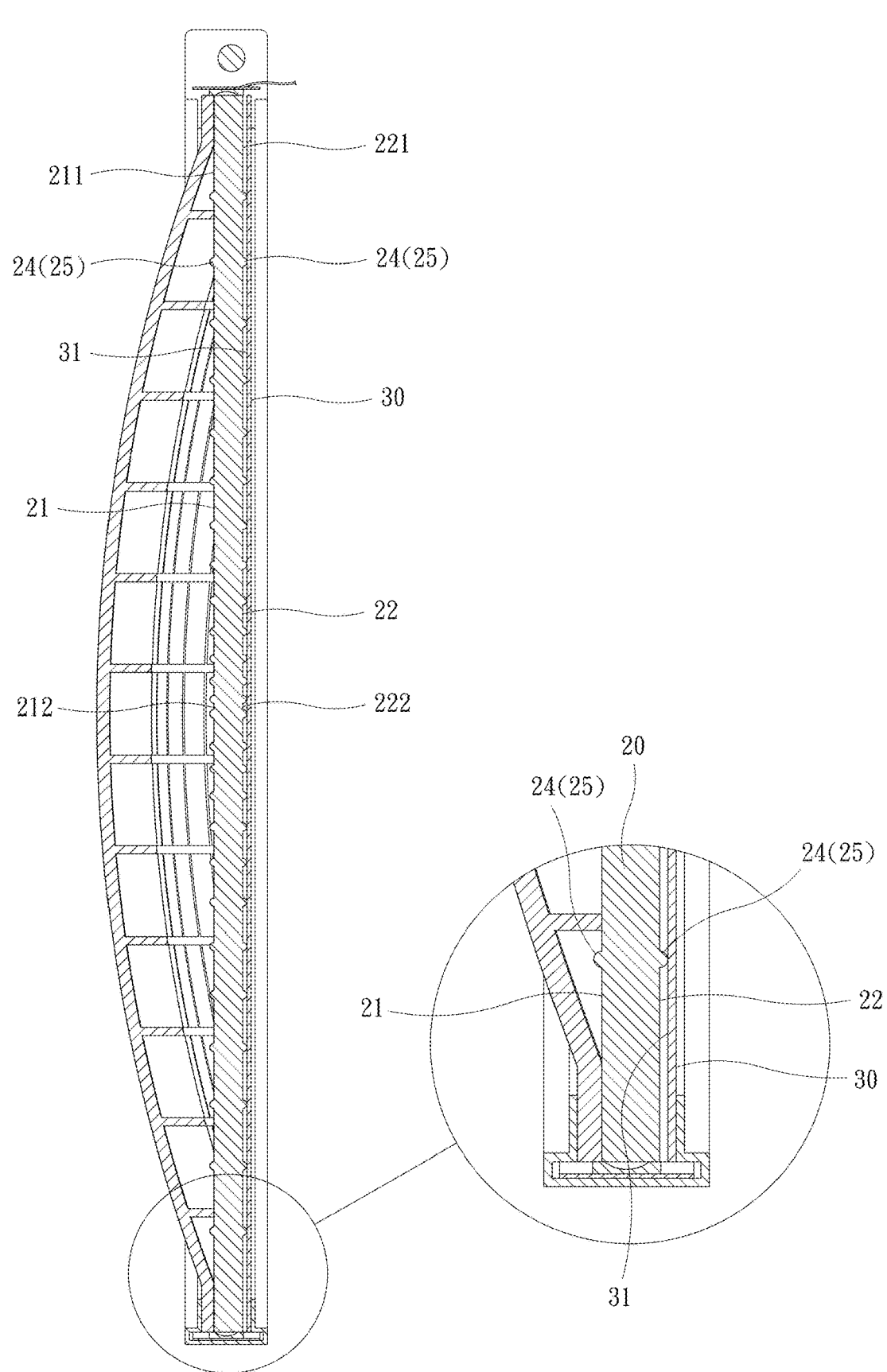
FIG. 10 shows a second example of implementation of a light guide plate according to the present invention.

Referring to FIG. 10, another way of implementation of the light guide plate 20 in the instant embodiment is provided, wherein the light emitting surface 21 and the bottom surface 22 of the light guide plate 20 are both provided with light blocking points 24 arranged at intervals, the light blocking points 24 are similarly arranged in a sparce-to-dense manner from the light emitting surface periphery 211 toward the light emitting surface center 212 to form a light blocking line 25 and from a bottom surface periphery 221 toward a bottom surface center 222 to form a light blocking line 25, and the light emitting surface 21 and the bottom surface 22 are both provided with multiple light blocking lines arranged at intervals, the effect of which is that in addition to the light blocking points 24 on the light emitting surface 21 exhibiting a higher brightness and uniform effect, the arrangement of the light blocking points 24 on the bottom surface 22 allows more light to be directly diffused (scattered) to the light emitting surface 21, and part of the light refracted to the light reflection plate 30 is then reflected to the light emitting surface 21, so as to make brightness emitting from the lamp 100 is further enhanced.

Figure 12:
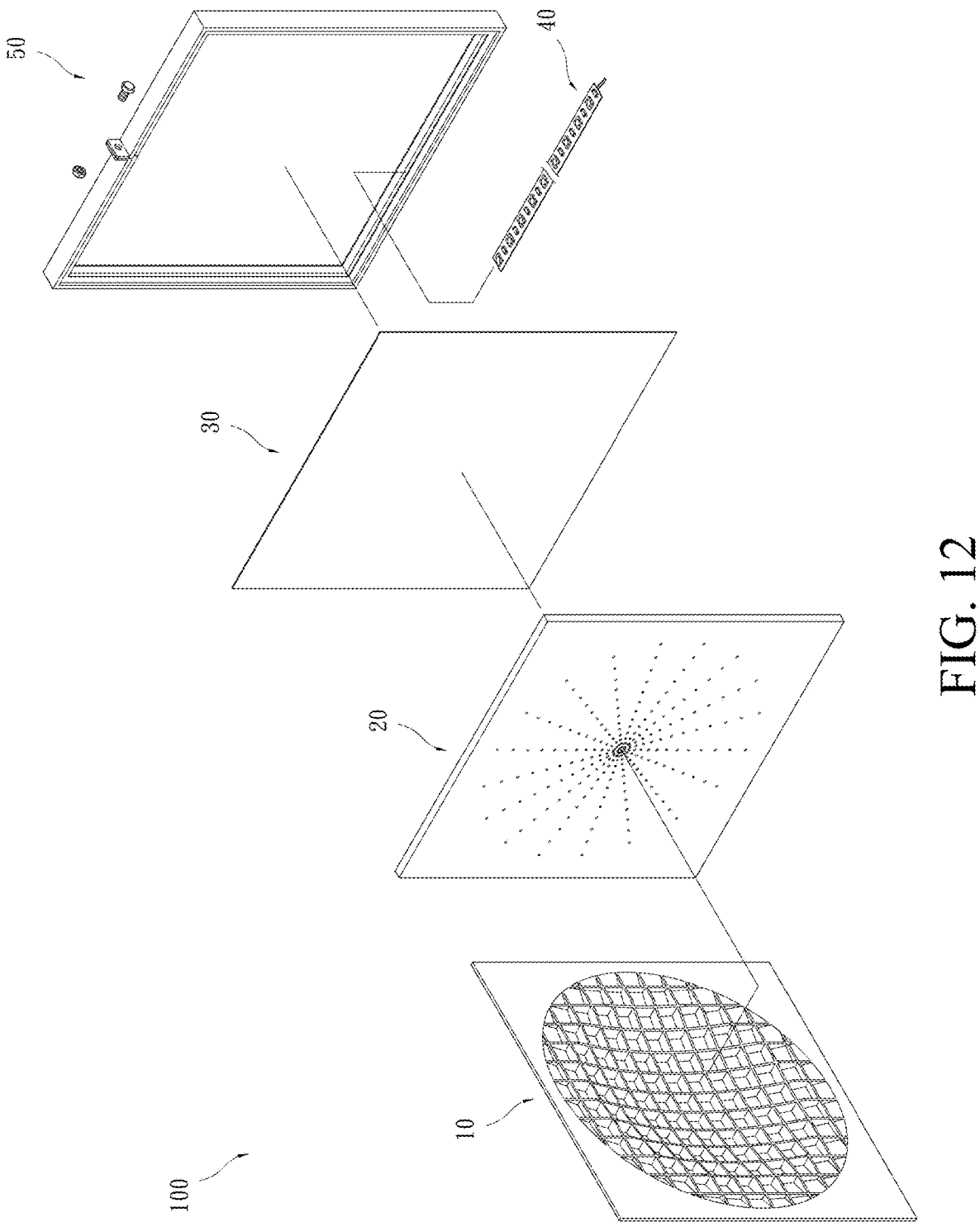
FIG. 12 is another example of implementation of a lamp according to the present invention.

Referring to FIG. 12, in the lamp 100 according to the present invention, outer contours of the protective cover 10, the light guide plate 20, the light reflection plate 30, and the circumferential frame 50 can be alternatively set to be rectangular, while the structure and method of assembly are the same, wherein the convex portion of the protective cover 10 is still set to be circular, which can also achieve the effect of energy saving and make the lamp emit higher brightness and uniform visual effect.

I claim:

1. A lamp of a traffic light, comprising: a light guide plate, a protective cover, a light reflection plate, a light-emitting strip, and a circumferential frame;

the light guide plate having one side defining a light emitting surface and an opposite side defining a bottom surface, an outer circumferential surface arranged between and circumferentially surrounding the light emitting surface and the bottom surface, the light emitting surface comprising light blocking points formed thereon and arranged at intervals;

the protective cover being made of a light-transmissive material and comprising a convex portion and a circumferential flange, the circumferential flange circumferentially surrounding an outer edge of the convex portion;

the light-emitting strip comprising a circuit substrate and a plurality of light-emitting diode (LED) lights arranged on the circuit substrate, each of the LED lights being electrically connected to the circuit substrate, the circuit substrate being flexible and bendable;

the light reflection plate being positioned against and in contact with the bottom surface of the light guide plate and having a surface facing the light guide plate bottom surface, wherein the surface facing the light guide plate bottom surface forms a light reflection surface with a light reflecting effect;

the circumferential frame being in the shape of a ring and comprising an inner circumferential groove, the inner circumferential groove being in communication with an interior surrounded by the circumferential frame, a wall surface of the inner circumferential groove forming a light reflection surface with a light reflecting effect, so as to form a closed chamber for reflecting light; and the protective cover being positioned against and in contact with the light emitting surface of the light guide plate, wherein the light reflection surface of the light reflection plate being positioned against and in contact with the bottom surface of the light guide plate, the light-emitting strip circumferentially wrapping around the outer circumferential surface of the light guide plate, each of the LED lights being positioned on and in contact with the outer circumferential surface of the light guide plate, the protective cover, the light guide plate, the light reflection plate, and the light-emitting strip being received in the inner circumferential groove of the circumferential frame and surrounded by the circumferential frame to be combined together.

2. The lamp of the traffic light according to claim 1, wherein the light blocking points are arranged to extend, in a sparse-to-dense manner, from a light emitting surface periphery toward a light emitting surface center to form a light blocking line, and the light emitting surface is provided with multiple light blocking lines arranged at intervals.

3. The lamp of the traffic light according to claim 1, wherein the light blocking points are formed on the bottom surface of the light guide plate and arranged at intervals, and the light blocking points are arranged to extend, in a sparse-to-dense manner, from a bottom surface periphery toward a bottom surface center to form a light blocking line, and the bottom surface is provided with multiple light blocking lines arranged at intervals.

4. The lamp of the traffic light according to claim 1, wherein the light blocking points are one of a convex point, a concave point, and ink printing.

5. The lamp of the traffic light according to claim 3, wherein the light blocking points are one of a convex point, a concave point, and ink printing.

6. The lamp of the traffic light according to claim 1, wherein a back side of the convex portion of the protective cover is in a concave configuration, and the back side of the convex portion is formed with a grid in a vertical-and-horizontal intersecting configuration.

7. The lamp of the traffic light according to claim 1, wherein the light blocking points of the light emitting surface are arranged in the form of one of a left-turn arrow and a right-turn arrow.

8. The lamp of the traffic light according to claim 1, wherein the LED lights are one of red light, green light, and yellow light.

9. The lamp of the traffic light according to claim 1, wherein the circumferential frame comprises an outer circumferential surface and side walls extending from two edges of the outer circumferential surface toward the interior surrounded by the circumferential frame, and an inner circumferential groove is defined between the outer circumferential surface and the side walls.

10. The lamp of the traffic light according to claim 1, wherein the outer circumferential surface of the light guide plate is formed with a plurality of cavities arranged at intervals, and each of the LED lights arranged on the light-emitting strip is made in a form of a protrusion, and the LED lights are respectively inserted into and fit in cavities corresponding thereto.

* * * * *